(12) United States Patent
Foster et al.

(10) Patent No.: US 9,995,149 B2
(45) Date of Patent: *Jun. 12, 2018

(54) STRUCTURAL CONFIGURATIONS AND COOLING CIRCUITS IN TURBINE BLADES

(71) Applicant: General Electric Company, Schenectady, NY (US)

(72) Inventors: Gregory Thomas Foster, Greer, SC (US); Lisa Anne Wichmann, Smyrna, GA (US); Brian Denver Potter, Greer, SC (US); Aaron Ezekiel Smith, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1280 days.

This patent is subject to a terminal disclaimer.

(21) Appl. No.: 14/143,443

(22) Filed: Dec. 30, 2013

(65) Prior Publication Data

US 2015/0184519 A1    Jul. 2, 2015

(51) Int. Cl.
   F01D 5/18    (2006.01)

(52) U.S. Cl.
   CPC ............. F01D 5/187 (2013.01); F01D 5/188 (2013.01); *F05D 2240/305* (2013.01); *F05D 2240/306* (2013.01); *F05D 2250/71* (2013.01); *F05D 2250/711* (2013.01); *F05D 2250/712* (2013.01); *F05D 2250/713* (2013.01); *F05D 2250/75* (2013.01); *F05D 2260/22141* (2013.01); *Y02T 50/676* (2013.01)

(58) Field of Classification Search
   CPC ................... F01D 5/188; F05D 2260/22141
   See application file for complete search history.

(56) References Cited

U.S. PATENT DOCUMENTS

| | | |
|---|---|---|
| 5,702,232 A | 12/1997 | Moore |
| 6,705,836 B2 | 3/2004 | Bourriaud et al. |
| 6,974,308 B2 | 12/2005 | Halfmann et al. |
| 7,303,376 B2 | 12/2007 | Liang |
| 7,377,746 B2 | 5/2008 | Brassfield et al. |
| 7,753,650 B1 | 7/2010 | Liang |
| 8,123,489 B2 * | 2/2012 | Udall ................... F01D 5/147 29/889.72 |
| 9,267,381 B2 * | 2/2016 | Morris .................. F01D 5/183 |
| 2011/0236221 A1 | 9/2011 | Campbell |

* cited by examiner

*Primary Examiner* — Justin Seabe
*Assistant Examiner* — Juan G Flores
(74) *Attorney, Agent, or Firm* — Mark E. Henderson; Ernest G. Cusick; Frank A. Landgraff

(57) ABSTRACT

A turbine blade having an airfoil defined by a concave shaped pressure side outer wall and a convex shaped suction side outer wall that connect along leading and trailing edges and, therebetween, form a radially extending chamber for receiving the flow of a coolant. The turbine blade may further include a rib configuration that partitions the chamber into radially extending flow passages. The rib configuration may include a camber line rib having a wavy profile. The wavy profile may include at least one back-and-forth "S" shape.

17 Claims, 9 Drawing Sheets

US 9,995,149 B2

STRUCTURAL CONFIGURATIONS AND COOLING CIRCUITS IN TURBINE BLADES

BACKGROUND OF THE INVENTION

This invention relates to turbine airfoils, and more particularly to hollow turbine airfoils, such as rotor or stator blades, having internal channels for passing fluids such as air to cool the airfoils.

Combustion or gas turbine engines (hereinafter "gas turbines") include a compressor, a combustor, and a turbine. As is well known in the art, air compressed in the compressor is mixed with fuel and ignited in the combustor and then expanded through the turbine to produce power. The components within the turbine, particularly the circumferentially arrayed rotor and stator blades, are subjected to a hostile environment characterized by the extremely high temperatures and pressures of the combustion products that are expended therethrough. In order to withstand the repetitive thermal cycling as well as the extreme temperatures and mechanical stresses of this environment, the airfoils must have a robust structure and be actively cooled.

As will be appreciated, turbine rotor and stator blades often contain internal passageways or circuits that form a cooling system through which a coolant, typically air bled from the compressor, is circulated. Such cooling circuits are typically formed by internal ribs that provide the required structural support for the airfoil, and include multiple flow paths designed to maintain the airfoil within an acceptable temperature profile. The air passing through these cooling circuits often is vented through film cooling apertures formed on the leading edge, trailing edge, suction side, and pressure side of the airfoil.

It will be appreciated that the efficiency of gas turbines increases as firing temperatures rise. Because of this, there is a constant demand for technological advances that enable turbine blades to withstand ever higher temperatures. These advances sometimes include new materials that are capable of withstanding the higher temperatures, but just as often they involve improving the internal configuration of the airfoil so to enhance the blades structure and cooling capabilities. However, because the use of coolant decreases the efficiency of the engine, new arrangements that rely too heavily on increased levels of coolant usage merely trade one inefficiency for another. As a result, there continues to be demand for new airfoil designs that offer internal airfoil configurations and coolant circulation that improves coolant efficiency.

A consideration that further complicates design of internally cooled airfoils is the temperature differential that develops during operation between the airfoils internal and external structure. That is, because they are exposed to the hot gas path, the external walls of the airfoil typically reside at much higher temperatures during operation than many of the internal ribs, which, for example, may have coolant flowing through passageways defined to each side of them. In fact, a common airfoil configuration includes a "four-wall" arrangement in which lengthy inner ribs run parallel to the pressure and suction side outer walls. It is known that high cooling efficiency can be achieved by the near-wall flow passages that are formed in the four-wall arrangement, however, the outer walls experience a significantly greater level of thermal expansion than the inner walls. This imbalanced growth causes stress to develop at the points at which the inner ribs and outer walls connect, which may cause low cyclic fatigue that can shorten the life of the blade. As such, the development of airfoil structures that use coolant more efficiently while also reducing stress caused by imbalanced thermal expansion between internal and external regions remains a significant technological industry objection.

BRIEF DESCRIPTION OF THE INVENTION

The present application thus describes a turbine blade having an airfoil defined by a concave shaped pressure side outer wall and a convex shaped suction side outer wall that connect along leading and trailing edges and, therebetween, form a radially extending chamber for receiving the flow of a coolant. The turbine blade may further include a rib configuration that partitions the chamber into radially extending flow passages. The rib configuration may include a camber line rib having a wavy profile. The wavy profile may include at least one back-and-forth "S" shape.

The present application further describes a rib configuration that includes a camber line rib having a wavy profile having at least two consecutive back-and-forth "S" shapes. The camber line rib having the wavy profile may originate near the leading edge of the airfoil and wind back-and-forth across an arcing path that extends toward the trailing edge of the airfoil. The arcing path may be approximately parallel to a camber reference line of the airfoil. The rib configuration may include traverse ribs that extend across the airfoil so to connect the camber line rib to the pressure side outer wall and/or the suction side outer wall. In certain embodiments, the traverse ribs include an angle of connection with the pressure side outer wall and the suction side outer wall of less than about 60 degrees.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
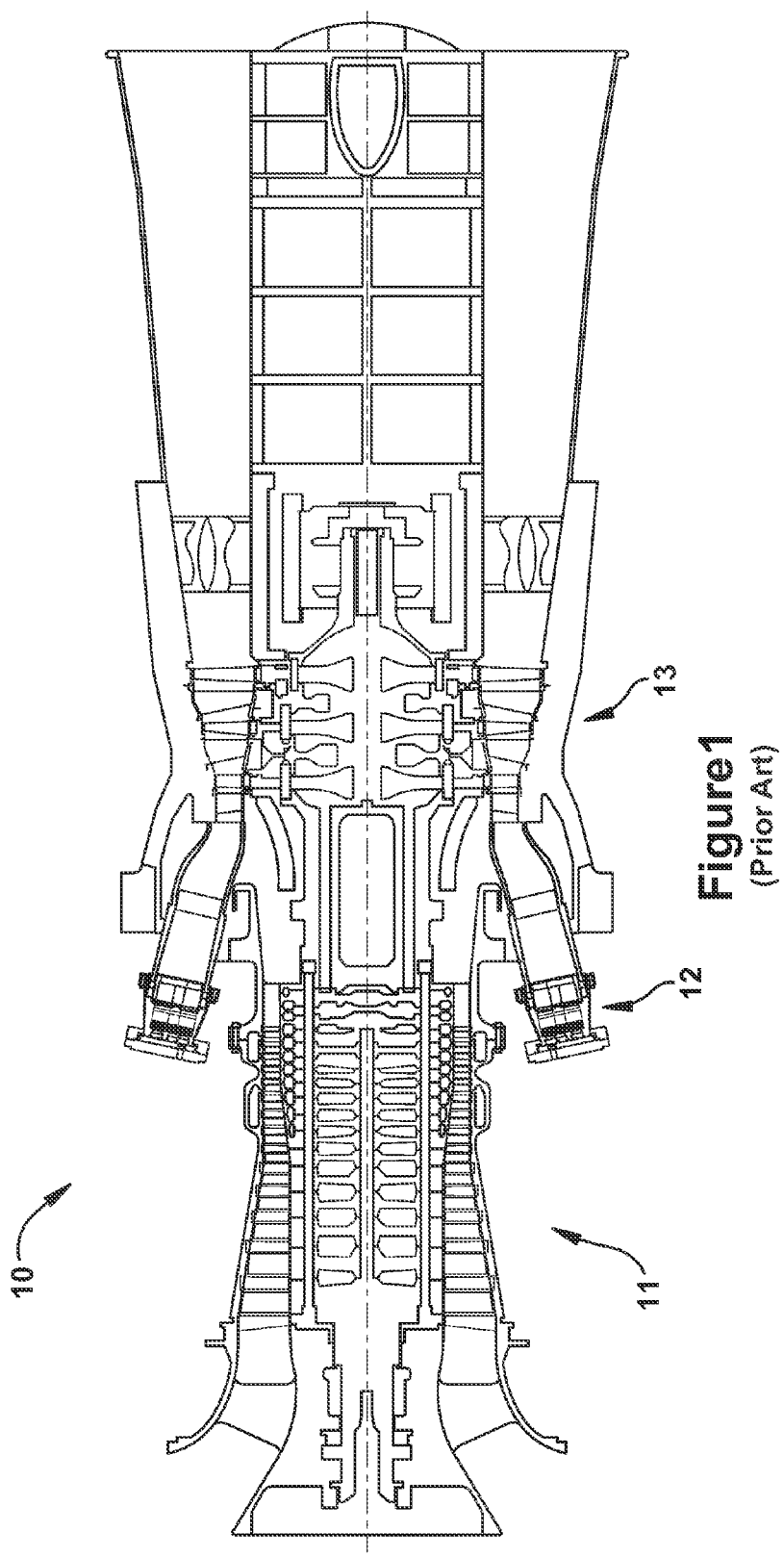
FIG. 1 is a schematic representation of an exemplary turbine engine in which certain embodiments of the present application may be used.

As an initial matter, in order to clearly describe the current invention it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part. Accordingly, in understanding the scope of the present invention, attention should not only be paid to the terminology and description provided herein, but also to the structure, configuration, function, and/or usage of the component.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft", without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

By way of background, referring now to the figures, FIGS. 1 through 4 illustrate an exemplary combustion turbine engine in which embodiments of the present application may be used. It will be understood by those skilled in the art that the present invention is not limited to this particular type of usage. The present invention may be used in combustion turbine engines, such as those used in power generation, airplanes, as well as other engine types. The examples provided are not meant to be limiting unless otherwise stated.

FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between the compressor 11 and the turbine 13.

Figure 2:
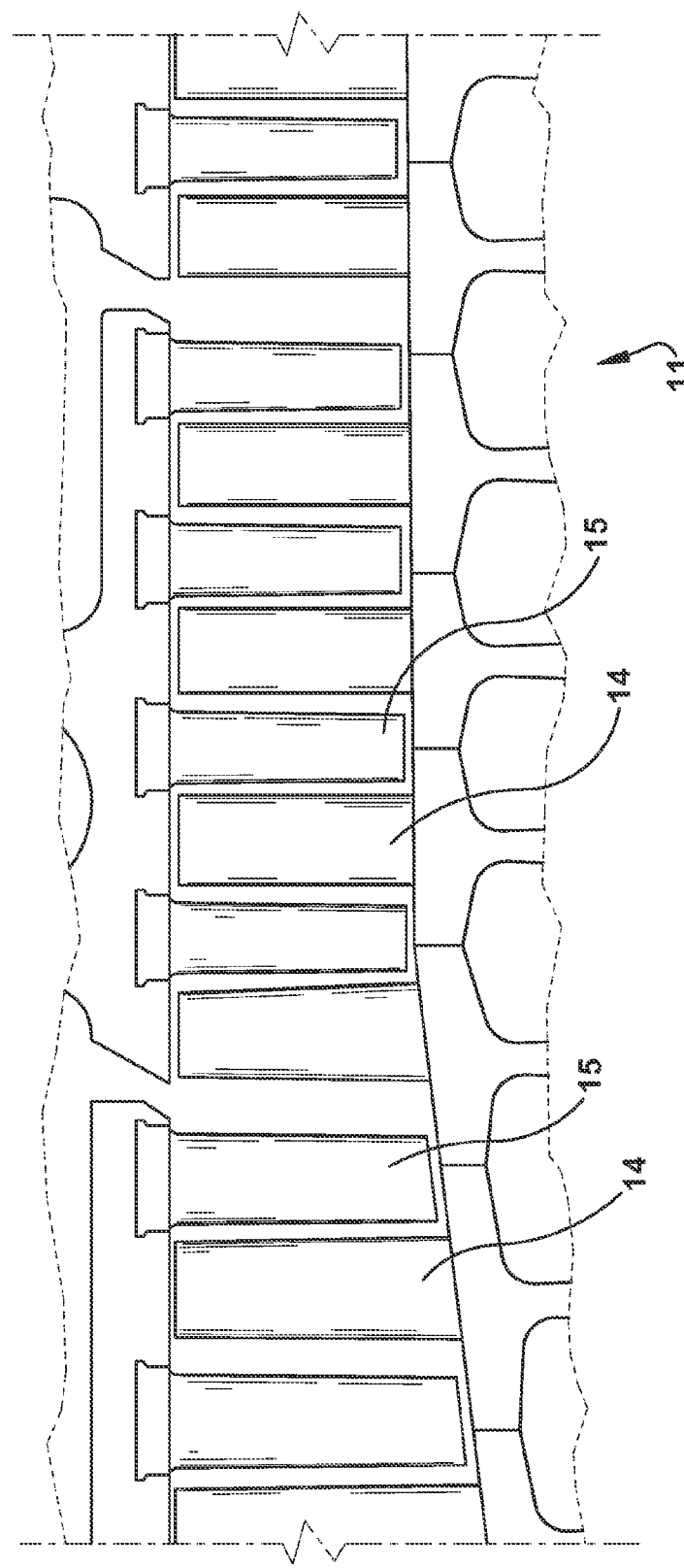
FIG. 2 is a sectional view of the compressor section of the combustion turbine engine of FIG. 1.

FIG. 2 illustrates a view of an exemplary multi-staged axial compressor 11 that may be used in the combustion turbine engine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

Figure 3:
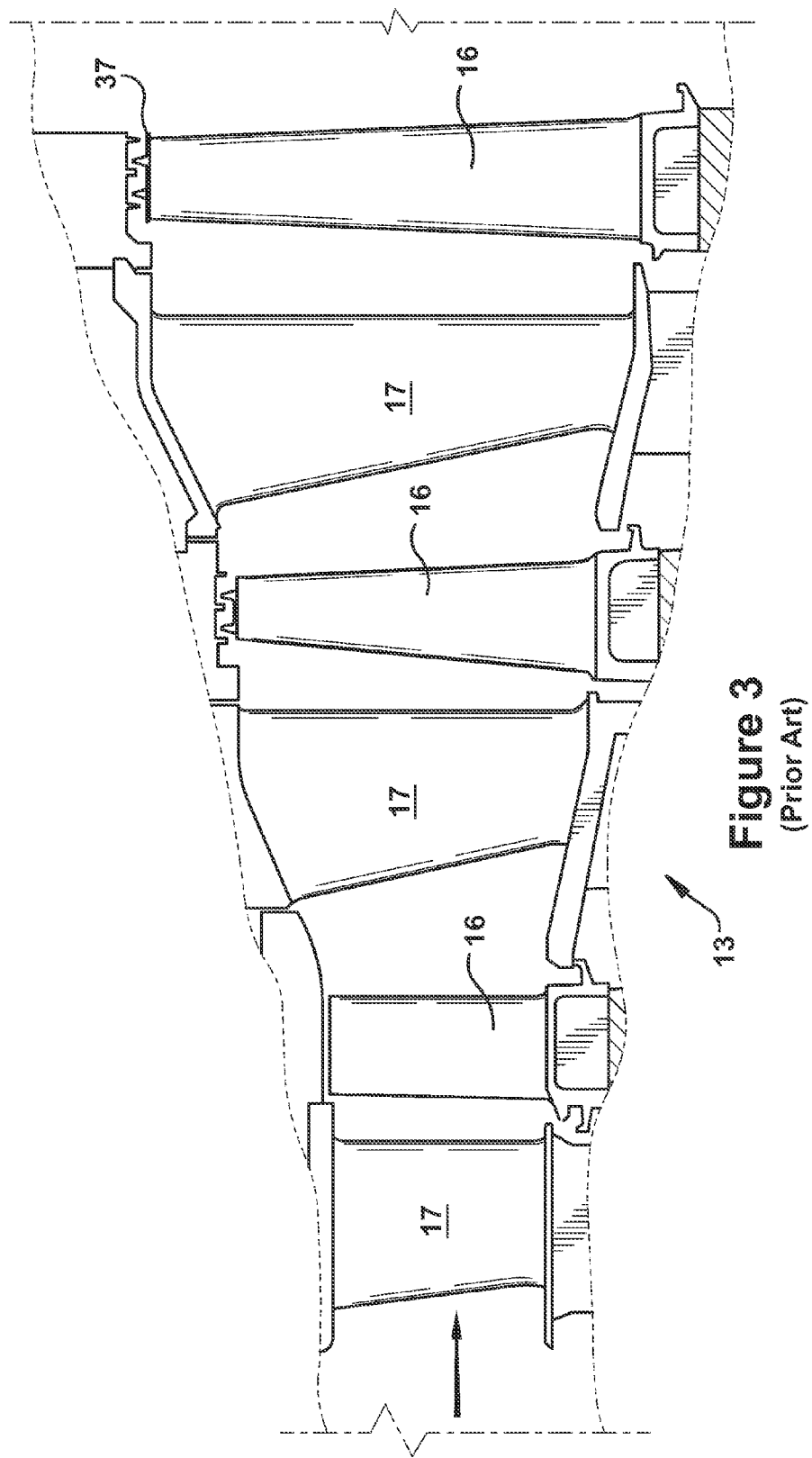
FIG. 3 is a sectional view of the turbine section of the combustion turbine engine of FIG. 1.

FIG. 3 illustrates a partial view of an exemplary turbine section or turbine 13 that may be used in the combustion turbine engine of FIG. 1. The turbine 13 may include a plurality of stages. Three exemplary stages are illustrated, but more or less stages may be present in the turbine 13. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 13 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot gas path of the turbine 13. The direction of flow of the hot gases through the hot gas path is indicated by the arrow. As one of ordinary skill in the art will appreciate, the turbine 13 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within the axial compressor 11 may compress a flow of air. In the combustor 12, energy may be released when the compressed air is mixed with a fuel and ignited. The resulting flow of hot gases from the combustor 12, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 4:
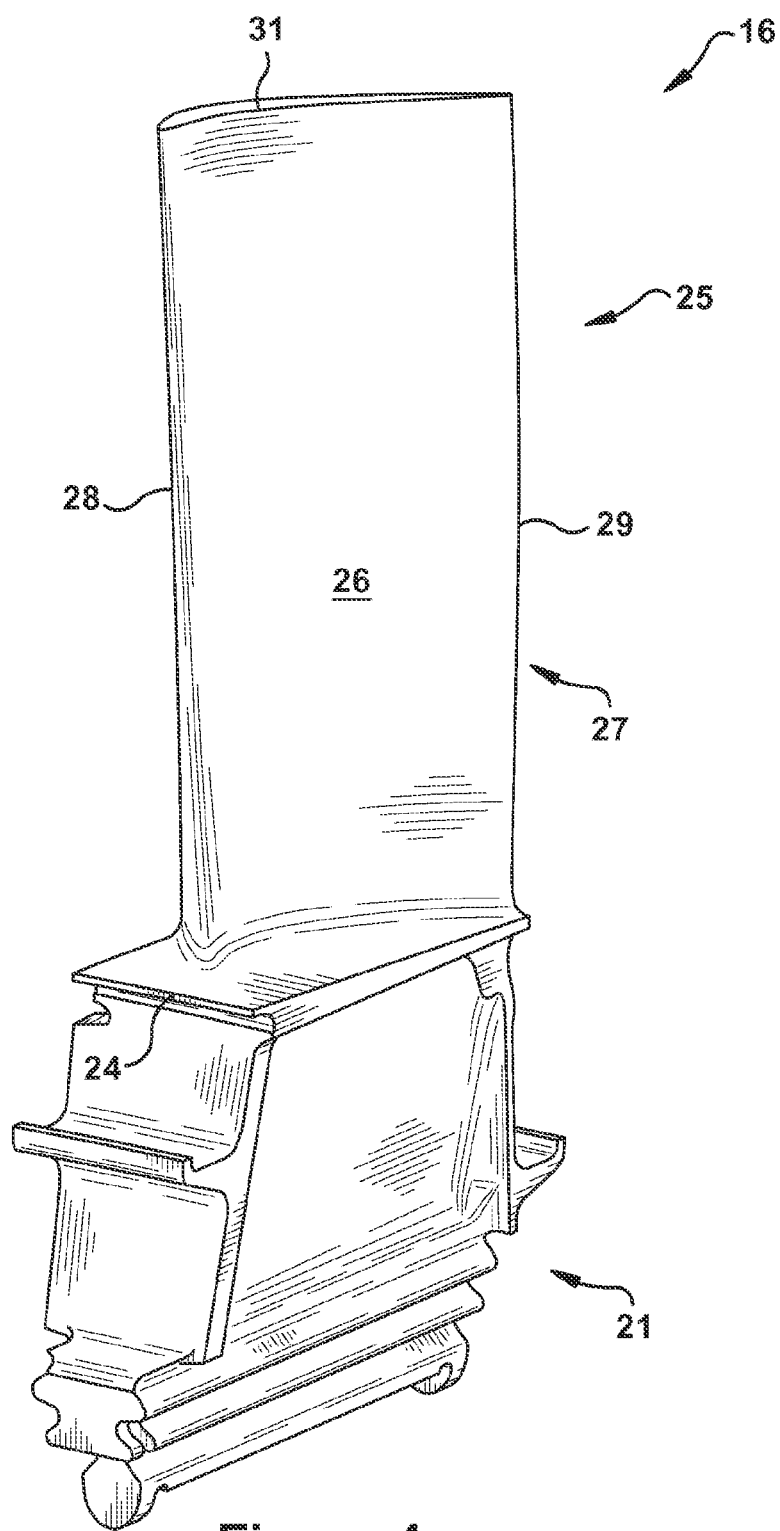
FIG. 4 is a perspective view of a turbine rotor blade of the type in which embodiments of the present invention may be employed.

FIG. 4 is a perspective view of a turbine rotor blade 16 of the type in which embodiments of the present invention may be employed. The turbine rotor blade 16 includes a root 21 by which the rotor blade 16 attaches to a rotor disc. The root 21 may include a dovetail configured for mounting in a corresponding dovetail slot in the perimeter of the rotor disc. The root 21 may further include a shank that extends between the dovetail and a platform 24, which is disposed at the junction of the airfoil 25 and the root 21 and defines a portion of the inboard boundary of the flow path through the turbine 13. It will be appreciated that the airfoil 25 is the active component of the rotor blade 16 that intercepts the flow of working fluid and induces the rotor disc to rotate. While the blade of this example is a turbine rotor blade 16, it will be appreciated that the present invention also may be applied to other types of blades within the turbine engine 10, including turbine stator blades 17. It will be seen that the airfoil 25 of the rotor blade 16 includes a concave pressure side outer wall 26 and a circumferentially or laterally opposite convex suction side outer wall 27 extending axially between opposite leading and trailing edges 28, 29 respectively. The sidewalls 26 and 27 also extend in the radial direction from the platform 24 to an outboard tip 31. (It will be appreciated that the application of the present invention may not be limited to turbine rotor blades, but may also be applicable to stator blades. The usage of rotor blades in the several embodiments described herein is exemplary unless otherwise stated.)

Figure 5:
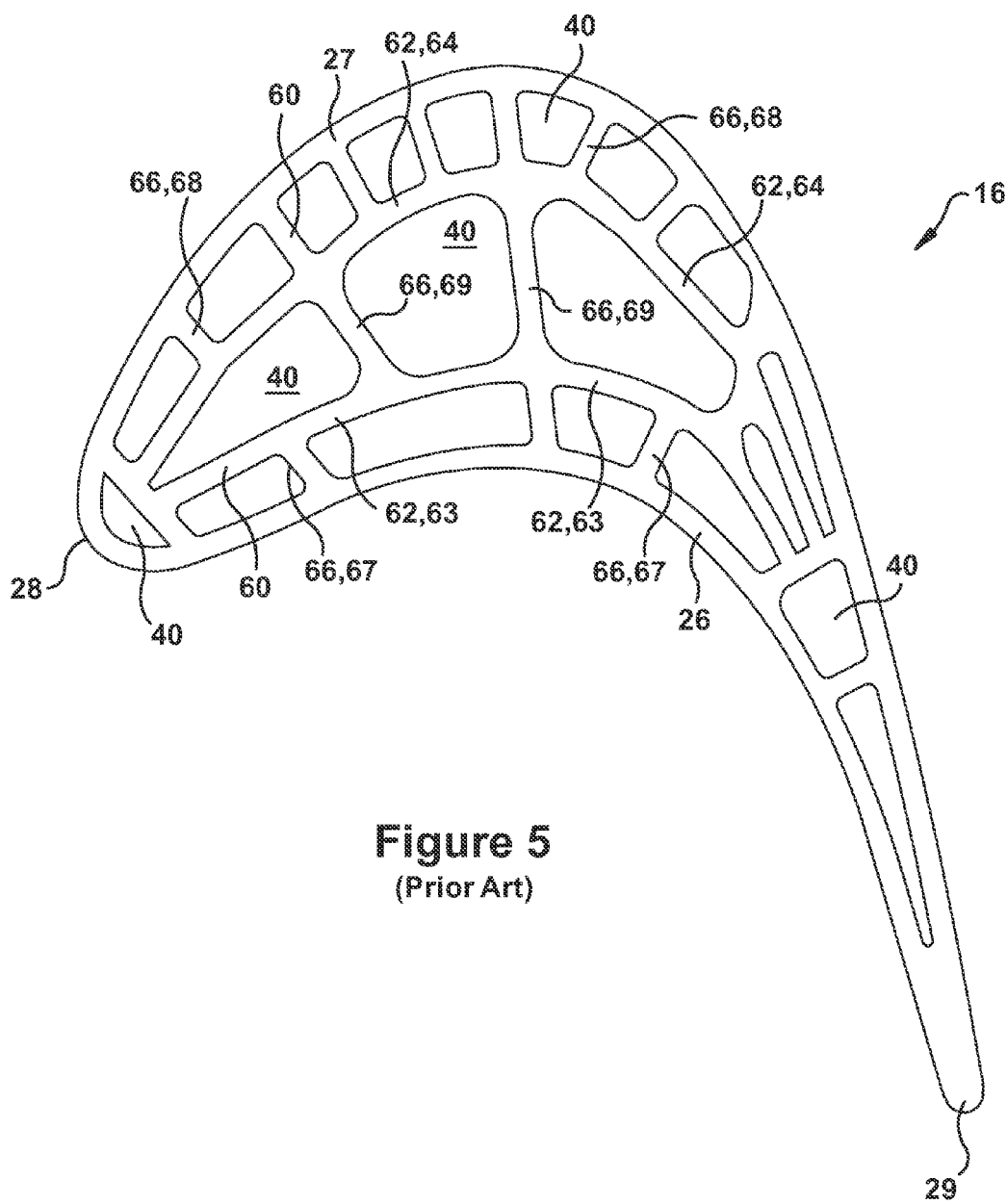
FIG. 5 is a cross-sectional view of a turbine rotor blade having an inner wall or rib configuration according to conventional design.

FIG. 5 shows an internal wall construction as may be found in a rotor blade airfoil 25 having a conventional design. As indicated, the outer surface of the airfoil 25 may be defined by a relatively thin pressure side outer wall 26 and suction side outer wall 27, which may be connected via a plurality of radially extending and intersecting ribs 60. The ribs 60 are configured to provide structural support to the airfoil 25, while also defining a plurality of radially extending and substantially separated flow passages 40. Typically the ribs 60 extend radially so to partition the flow passages 40 over much of the radial height of the airfoil 25, but, as discussed more below, the flow passage may be connected along the periphery of the airfoil so to define a cooling circuit. That is, the flow passages 40 may fluidly communicate at the outboard or inboard edges of the airfoil 25, as well as via a number of smaller crossover passages or impingement apertures (not shown) that may be positioned therebetween. In this manner certain of the flow passages 40 together may form a winding or serpentine cooling circuit. Additionally, film cooling ports (not shown) may be included that provide outlets through which coolant is released from the flow passages 40 onto the outer surface of the airfoil 25.

The ribs 60 may include two different types, which then, as provided herein, may be subdivided further. A first type, a camber line rib 62, is typically a lengthy rib that extends in parallel or approximately parallel to the camber line of the airfoil, which is a reference line stretching from the leading edge 28 to the trailing edge 29 that connects the midpoints between the pressure side outer wall 26 and the suction side outer wall 27. As is often the case, the conventional configuration of FIG. 5 includes two camber line ribs 62, a pressure side camber line rib 63, which also may be referred to as the pressure side inner wall given the manner in which it is offset from and close to the pressure side outer wall 26, and a suction side camber line rib 64, which also may be referred to as the suction side inner wall given the manner in which it is offset from and close to the suction side outer wall 27. As mentioned, this type of design is often referred to as having a "four-wall" configuration due to the prevalent four main walls that include the two sidewalls 26, 27 and the two camber line ribs 63, 64. It will be appreciated that the outer walls 26, 27 and the camber line ribs 62 are cast as integral components.

The second type of rib is referred to herein as a traverse rib 66. Traverse ribs 66 are the shorter ribs that are shown connecting the walls and inner ribs of the four-wall configuration. As indicated, the four walls may be connected by a number of the traverse ribs 66, which may be further classified according to which of the walls each connects. As used herein, the traverse ribs 66 that connect the pressure side outer wall 26 to the pressure side camber line rib 63 are referred to as pressure side traverse ribs 67. The traverse ribs 66 that connect the suction side outer wall 27 to the suction side camber line rib 64 are referred to as suction side traverse ribs 68. Finally, the traverse ribs 66 that connect the pressure side camber line rib 63 to the suction side camber line rib 64 are referred to as center traverse ribs 69.

In general, the purpose of four-wall internal configuration in an airfoil 25 is to provide efficient near-wall cooling, in which the cooling air flows in channels adjacent to the outer walls 26, 27 of the airfoil 25. It will be appreciated that near-wall cooling is advantageous because the cooling air is in close proximity of the hot outer surfaces of the airfoil, and the resulting heat transfer coefficients are high due to the high flow velocity achieved by restricting the flow through narrow channels. However, such designs are prone to experiencing low cycle fatigue due to differing levels of thermal expansion experienced within the airfoil 25, which, ultimately, may shorten the life of the rotor blade. For example, in operation, the suction side outer walls 27 thermally expands more than the suction side camber line rib 64. This differential expansion tends to increase the length of the camber line of the airfoil 25, and, thereby, causes stress between each of these structures as well as those structures that connect them. In addition, the pressure side outer wall 26 also thermally expands more than the cooler pressure side camber line rib 63. In this case, the differential tends to decrease the length of the camber line of the airfoil 25, and, thereby, cause stress between each of these structures as well as those structures that connect them. The oppositional forces within the airfoil that, in the one case, tends to decrease the airfoil camber line and, in the other, increase it, can lead to further stress concentrations. The various ways in which these forces manifest themselves given an airfoil's particular structural configuration and the manner in which the forces are then balanced and compensated for becomes a significant determiner of the part life of the rotor blade 16.

More specifically, in a common scenario, the suction side outer wall 27 tends to bow outward at the apex of its curvature as exposure to the high temperatures of the hot gas path cause it to thermally expand. It will be appreciated that the suction side camber line rib 64, being an internal wall, does not experience the same level of thermal expansion and, therefore, does not have the same tendency to bow outward. The camber line rib 64 then resists the thermal growth of the outer wall 27. Because conventional designs have camber line ribs 62 formed with stiff geometries that provide little or no compliance, this resistance and the stress concentrations that result from it can be substantial. Exacerbating the problem, the traverse ribs 66 used to connect the camber line rib 62 to the outer wall 27 are formed with linear profiles and generally oriented at right angles in relation to the walls that they connect. This being the case, the traverse ribs 66 operate to basically hold fast the "cold" spatial relationship between the outer wall 27 and the camber line rib 64 as the heated structures expand at significantly different rates. Accordingly, with little or no "give" built into the structure, conventional arrangements are ill-suited at defusing the stress that concentrates in certain regions of the structure. The differential thermal expansion bus results in low cycle fatigue issues that shorten component life.

Many different internal airfoil cooling systems and structural configurations have been evaluated in the past, and attempts have been made to rectify this issue. One such approach proposes overcooling the outer walls 26, 27 so that the temperature differential and, thereby, the thermal growth differential are reduced. It will be appreciated, though, that the way in which this is typically accomplished is to increase the amount of coolant circulated through the airfoil. Because coolant is typically air bled from the compressor, its increased usage has a negative impact on the efficiency of the engine and, thus, is a solution that is preferably avoided. Other solutions have proposed the use of improved fabrication methods and/or more intricate internal cooling configurations that use the same amount of coolant, but use it more efficiently. While these solutions have proven somewhat effective, each brings additional cost to either the operation of the engine or the manufacture of the part, and does nothing to directly address the root problem, which is the geometrical deficiencies of conventional design in light of how airfoils grow thermally during operation.

The present invention generally teaches certain curving or bubbled or sinusoidal or wavy internal ribs (hereinafter "wavy ribs") that alleviate imbalanced thermal stresses that often occur in the airfoil of turbine blades. Within this general idea, the present application describes several ways in which this may be accomplished, which include wavy camber line ribs 62 and/or traverse ribs 66, as well as certain types of angled connections therebetween. It will be appreciated that these novel configurations—which, as delineated in the appended claims, may be employed separately or in combination—reduce the stiffness of the internal structure of the airfoil 25 so to provide targeted flexibility by which stress concentrations are dispersed and strain off-loaded to other structural regions that are better able to withstand it. This may include, for example, off-loading to a region that spreads the strain over a larger area, or, perhaps, structure that offloads tensile stress for a compressive load, which is typically more preferable. In this manner, life-shortening stress concentrations and strain may be avoided.

Figure 6:
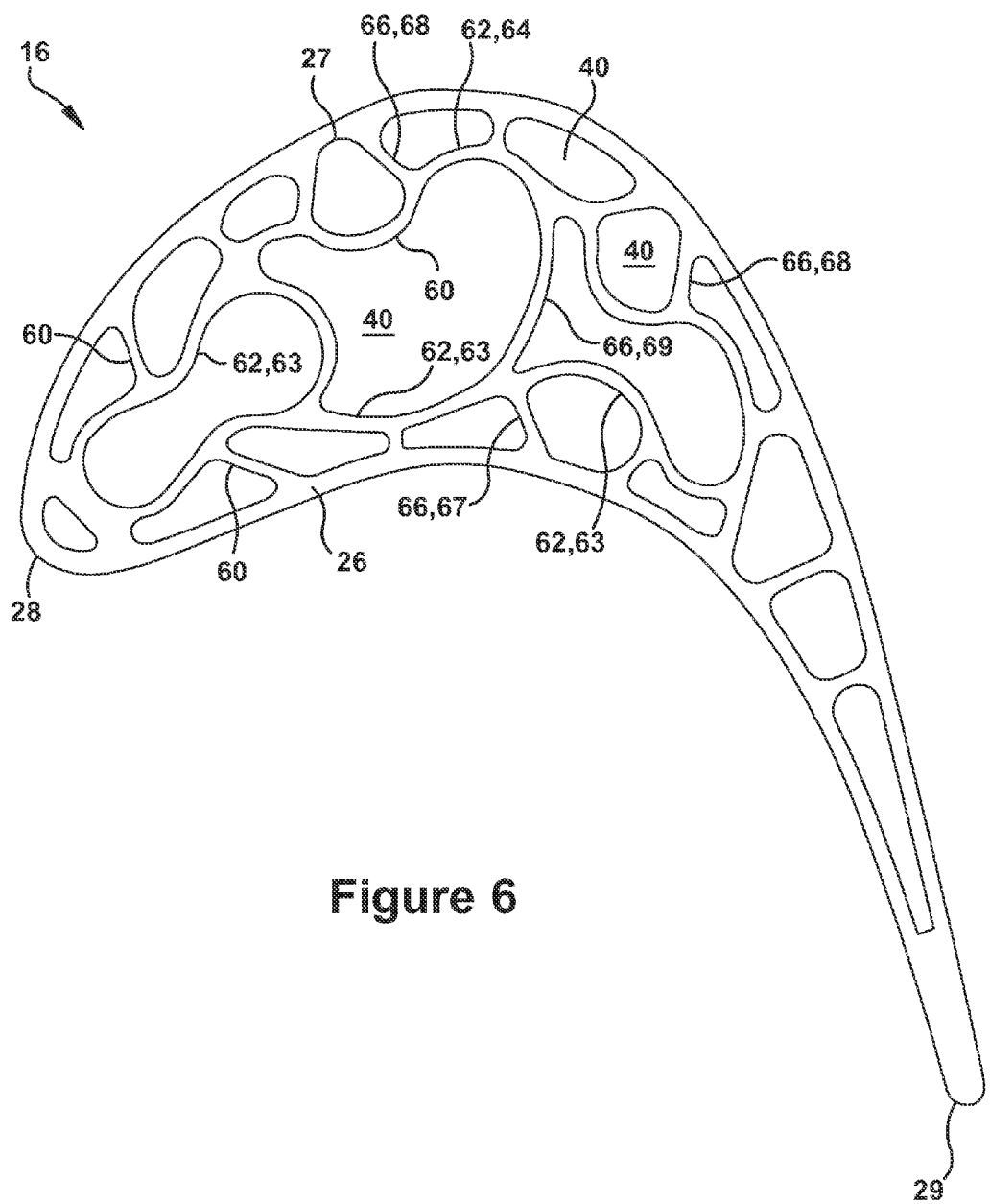
FIG. 6 is a cross-sectional view of a turbine rotor blade having an inner wall configuration according to an embodiment of the present invention.
Figure 7:
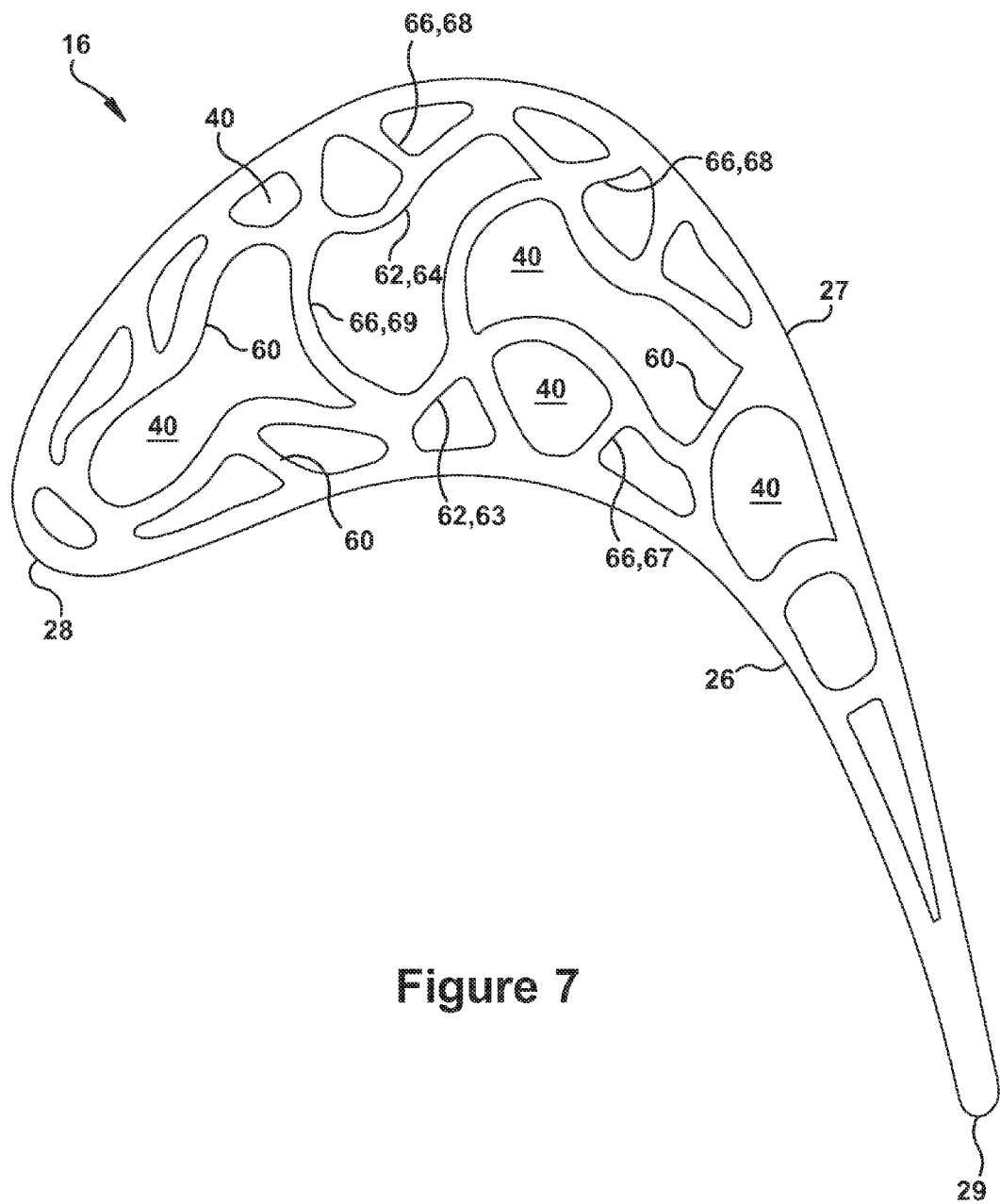
FIG. 7 is a cross-sectional view of a turbine rotor blade having an inner wall or rib configuration according to an alternative embodiment of the present invention.
Figure 8:
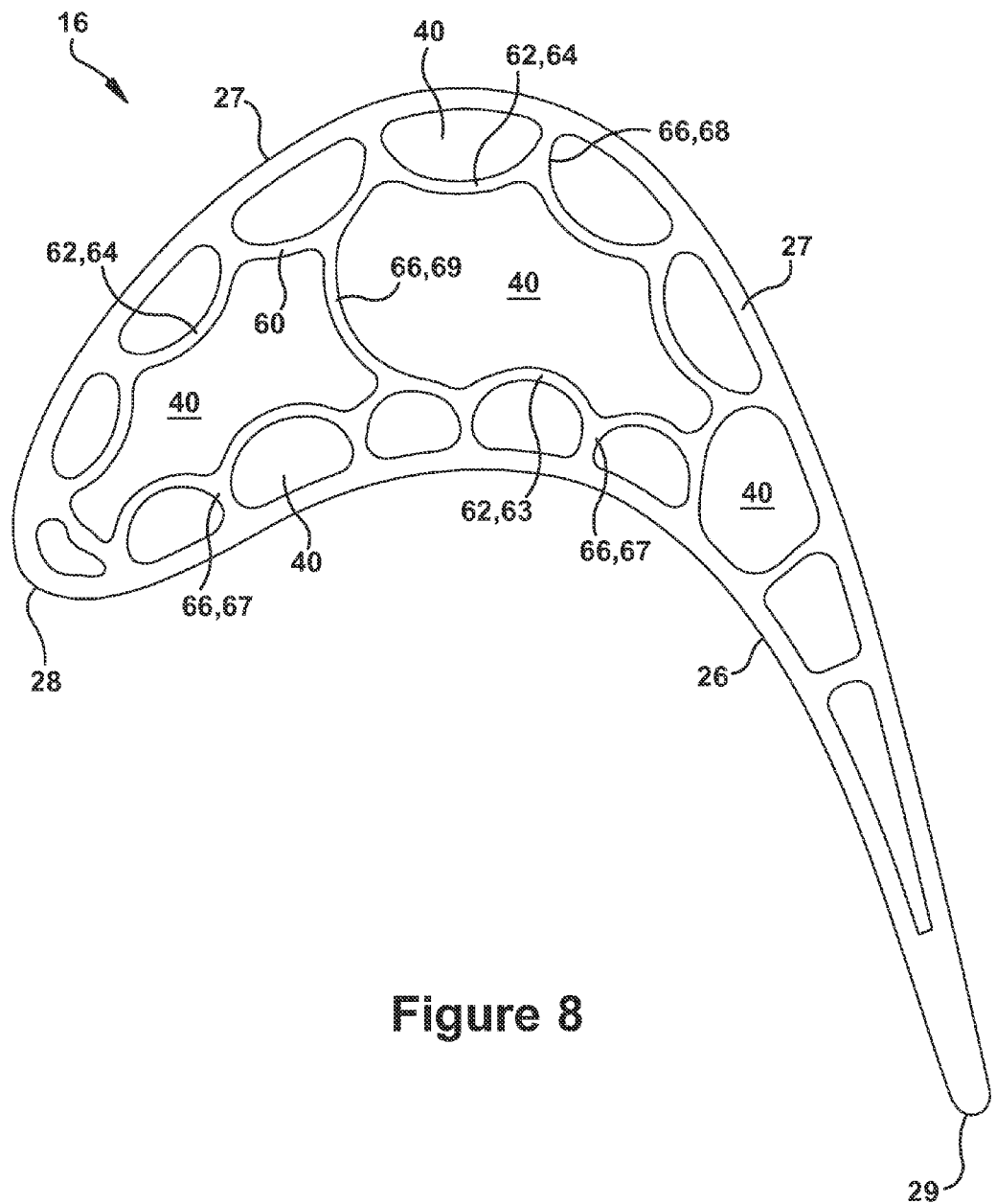
FIG. 8 is a cross-sectional view of a turbine rotor blade having an inner wall or rib configuration according to an alternative embodiment of the present invention.

FIGS. 6 through 8 provide cross-sectional views of a turbine rotor blade 16 having an inner wall configuration according to embodiments of the present invention. Specifically, the present invention involves the configuration of ribs 60 that are typically used as both structural support as well as partitions that divide hollow airfoils 25 into substantially separated radially extending flow passages 40 that may be interconnects as desired to create cooling circuits. These flow passages 40 and the circuits they form are used to direct a flow of coolant through the airfoil 25 in a particular manner so that its usage is targeted and more efficient. Though the examples provided herein are shown as they might be used in a turbine rotor blades 16, it will be appreciated that the same concepts also may be employed in turbine stator blades 17. In one embodiment, the rib configuration of the present invention includes a camber line rib 62 having a wavy profile. (As used herein, the term "profile" is intended to refer to the shape the ribs have in the cross-sectional views of FIGS. 6 through 8.) A camber line rib 62, as described above, is one of the longer ribs that typically extend from a position near the leading edge 28 of the airfoil 25 toward the trailing edge 29. These ribs are referred to as "camber line ribs" because the path they trace is approximately parallel to the camber line of the airfoil 25, which is a reference line extending between the leading edge 28 and the trailing edge 29 of the airfoil 25 through a collection of points that are equidistant between the concave pressure side outer wall 26 and the convex suction side outer wall 27. According to the present application, a "wavy profile" includes one that is noticeably curved and sinusoidal in shape, as indicated. In other words, the "wavy profile" is one that presents a back-and-forth "S" profile. Examples of this particular type of wavy profile are provided above FIGS. 6 and 7.

The segment or length of the camber line rib 62 that is configured with the wavy profile may vary depending on design criteria. In the provided examples the wavy camber line rib 62 typically stretches from a position near the leading edge 28 of the airfoil 25 to a position that is beyond the midpoint of the camber line of the airfoil 25. It will be appreciated that the wavy portion of the camber line rib 62 may be shorter in length while still providing the same types of performance advantages discussed herein. The number of curves as well as the length of the wavy segment of the camber line rib 62 may be varied to achieve the best results. In certain embodiments, the wavy camber line rib 62 of the present invention is defined by the number of complete back-and-forth "S" shapes it contains. In a preferred embodiment of this type, the wavy camber line rib 62 includes at least one continuous back-and-forth "S" shape. In another embodiment, the wavy camber line rib 62 includes at least two consecutive and continuous back-and-forth "S" shapes. It will be appreciated that the examples provided in FIGS. 6 and 7 each trace paths having more than two full "S" shapes. In regard to overall length, the wavy segment of the camber line rib 62 may extend for a substantial portion of the length of the camber line of the airfoil 25. For example, as shown in FIGS. 6 and 7, in a preferred embodiment, the wavy portion of the camber line rib 62 is over 50% of the length of the camber line of the airfoil 25. In other words, the wavy portion of the camber line rib 62 originates near the leading edge 28 of the airfoil 25 and extend rearward and well beyond the apex of the curvature of the airfoil 25. It will be appreciated that shorter lengths also may be employed with performance benefits, such as wavy portions of at least 15% of the camber line rib 62.

It will be appreciated that, given its winding profile, a wavy camber line rib 62 traces a path that varies in its directional heading. The wavy camber line rib 62 of the present invention may still be described as having a general arcing path across which it winds, and that this path typically extends from an origination point near the leading edge 28 and a trailing point near the trailing edge 29 of the airfoil 25. It will be appreciated that, in the case of a wavy camber line rib 62, it is this general arcing path that is roughly parallel to the camber line of the airfoil 25.

Many known airfoil 25 configurations, such as the four-wall example of FIG. 5 discussed above, include two camber line ribs 62. This type of configuration may be described as having a pressure side camber line rib 63 that resides nearer the pressure side outer wall 26, and a suction side camber line rib 64 that resides nearer the suction side outer wall 27. The present invention, as shown in FIGS. 6 and 7, may include configurations in which both the suction side camber line rib 64 and the pressure side camber line rib 63 are formed as wavy ribs. In alternative embodiments, only one of these camber line ribs 62 may have a wavy profile. It will be appreciated that the present invention may also be employed in configurations having only a single camber line rib 62.

In airfoils 25 that include two camber line ribs 62, it will be appreciated that the pressure side camber line rib 63 and the suction side camber line rib 64 define a center flow passage 40. The wavy profile for each of the pressure side camber line rib 63 and the suction side camber line rib 64 may be defined relative to the shape taken by successive segments of the camber line rib 62 facing center flow passage 40. That is, for example, relative to the central flow passage 40, the wavy profile of the camber line rib 62 may be described as including two successive segments in which a first concave segment transitions to a second convex segment. In an alternative embodiment, the wavy profile may include four or more successive segments in which: a first concave segment transitions to a second convex segment; the second convex segment transitions to a third concave segment; and the third concave segment transitions to a fourth convex segment.

As shown in FIG. 8, an alternative embodiment includes a repetition of convex segments. In this type of wavy rib embodiment, it will be appreciated that the wavy profile for the camber line ribs 62 (relative to the central flow passage) include successively stacked convex segments. In a preferred embodiment of this type, as illustrated, the camber line ribs 62 each includes at least four of these successively stacked convex segments. (It will be appreciated that in this type of embodiment, to avoid stress concentrations, a short concave segment may be used to connect the much longer convex segments.)

The present invention teaches certain configurations of traverse ribs 66 that may be employed to tune the compliancy of the airfoil 25. As used herein, traverse ribs 66 are the shorter ribs that extend across the airfoil 25. Traverse ribs 66 are used to connect camber line ribs 62 to either other camber line ribs or one of the outer walls 26, 27 of the airfoil 25. It will be appreciated that, configured in this way, traverse ribs 66 also serve as partitions to the flow passages 40 formed between the outer walls 26, 27 and the camber line ribs 62. As illustrated, the pressure side outer wall 26 and the pressure side camber line rib 63 are configured to define a pressure side flow passage 40 between them. Similarly, the suction side outer wall 27 and the suction side camber line rib 64 are configured to define a suction side flow passage 40 between them. Between the suction side camber line rib 64 and the pressure side camber line rib 63, the center flow passage 40 is defined. As indicated, these flow passages 40 then may be subdivided by the traverse ribs 66. In certain embodiments of the present invention, several pressure side traverse ribs 67 connect the pressure side outer wall 26 to the pressure side camber line rib 63. Thusly, the pressure side traverse ribs 67 divide the pressure side flow passage 40 into a number of separate, axially-stacked flow passages 40. Likewise, several suction side traverse ribs 68 connect the suction side outer wall 27 to the suction side camber line rib 64 and divide the suction side flow passage 40 into a number of separate, axially-stacked flow passages 40. Center traverse ribs 69 connect the pressure side camber line rib 63 to the suction side camber line rib 64, and similarly partition the center flow passage.

The camber line 62 ribs and traverse ribs 66 may be configured as radially extending walls. That is, these ribs may form the profiles shown in the cross-sectional views of FIGS. 6 through 8 while extending radially between the two ends of the airfoil 25. In this manner, the pressure side flow passages, suction side flow passages, and center flow passages 40 may extend radially between an inboard end that is near the interface between the airfoil 25 and the blade root 21 and an outboard end that is near the outboard tip 31 of the airfoil 25. In usage, a supply of coolant may be delivered to one or more of the inboard ends of the flow passages 40 via a supply passage that extends through a blade root 21. It will be appreciated that the flow passages 40 may be selectively connected at their inboard or outboard ends so to create a serpentine coolant path through the airfoil 25.

The rib configuration of the present invention may include several traverse ribs 66 on each of the pressure and suction sides of the airfoil 25. In preferred embodiments, at least five pressure side traverse ribs 67 and five suction side traverse ribs 68 may be included. Multiple center traverse ribs 69 also may be provided. As shown, in preferred embodiments, the present invention may include at least two center traverse ribs 69. The present invention further describes a connection assembly by which the traverse ribs 66 connect to the outer walls 26, 27 and/or the camber line ribs 62. It will be appreciated that the angle in which traverse ribs 66 intersect such walls 26, 27, 62 may be described by an "angle of connection". (It will be appreciated that the "angle of connection" referred to is the smaller of the two angles formed on both sides of each end of a traverse rib between the traverse rib and the wall it intersects.) In conventional airfoil configurations, as mentioned above, the angle of connection is a steep one, generally being close to 90°. It will be appreciated that steep angles like this make for a stiff structure. The present invention teaches angles that are less than 90° as a way in which the airfoil 25 structure, or targeted areas of the structure, may be made more compliant. According to one embodiment, as shown in FIGS. 6 and 7, at least two of the pressure side traverse ribs 67 may be configured so to have an angle of connection with the pressure side outer wall 26 of less than about 60 degrees. According to another embodiment, as indicated, at least two of the suction side traverse ribs 68 may be configured so to form an angle of connection with the suction side outer wall 27 of less than about 60 degrees. The center traverse ribs 69 may be similarly formed, and configurations of the present invention include having at least one angle of connection of less than about 60 degrees at each of the suction side camber line rib 64 and the pressure side camber line rib 63. Where greater compliance is required, embodiments may include having three of the pressure side traverse ribs 67 and three of the suction side traverse ribs 68 configured so to have an angle of connection with the outer walls 26, 27 of less than about 60 degrees, and at least two of the center traverse ribs 69 may be configured so to form an angle of connection of less than about 60 degrees at each of the suction side camber line rib 64 and the pressure side camber line rib 63.

The present invention further describes another manner in which traverse ribs 66 may enhance structural compliancy. Traverse ribs 66 typically are formed having a linear profile, which, as will be appreciated, results in a stiff and unyielding configuration. Pursuant to certain embodiments of the present invention, traverse ribs 66 are configured having a curved profile. Specifically, as shown in each of the examples in FIGS. 6 through 8, the center traverse ribs 69 may include an curved, arcuate or arcing profile. With this profile, the traverse ribs 66 become much more compliant and able to accommodate relative movement between the structural walls that they connect. The direction in which the curved arcing profile of the traverse rib is oriented may be manipulated so to accommodate the types of expected stresses. According to one preferred embodiment, as illustrated in FIG. 6, the arc of the center traverse rib 69 may be directed such that the concave face of the center traverse ribs 69 is directed toward the leading edge 28 of the airfoil 25. This orientation may be done to all of the center traverse ribs 69 that are included in a particular structure or a fraction thereof. In an alternative embodiment, as illustrated in FIG. 7, the arc of the center traverse ribs 69 may be directed such that the convex face of the traverse rib is directed away from the leading edge 28 of the airfoil 25. This type of profile may be used on all of center traverse ribs 69 or only a fraction of them.

Figure 9:
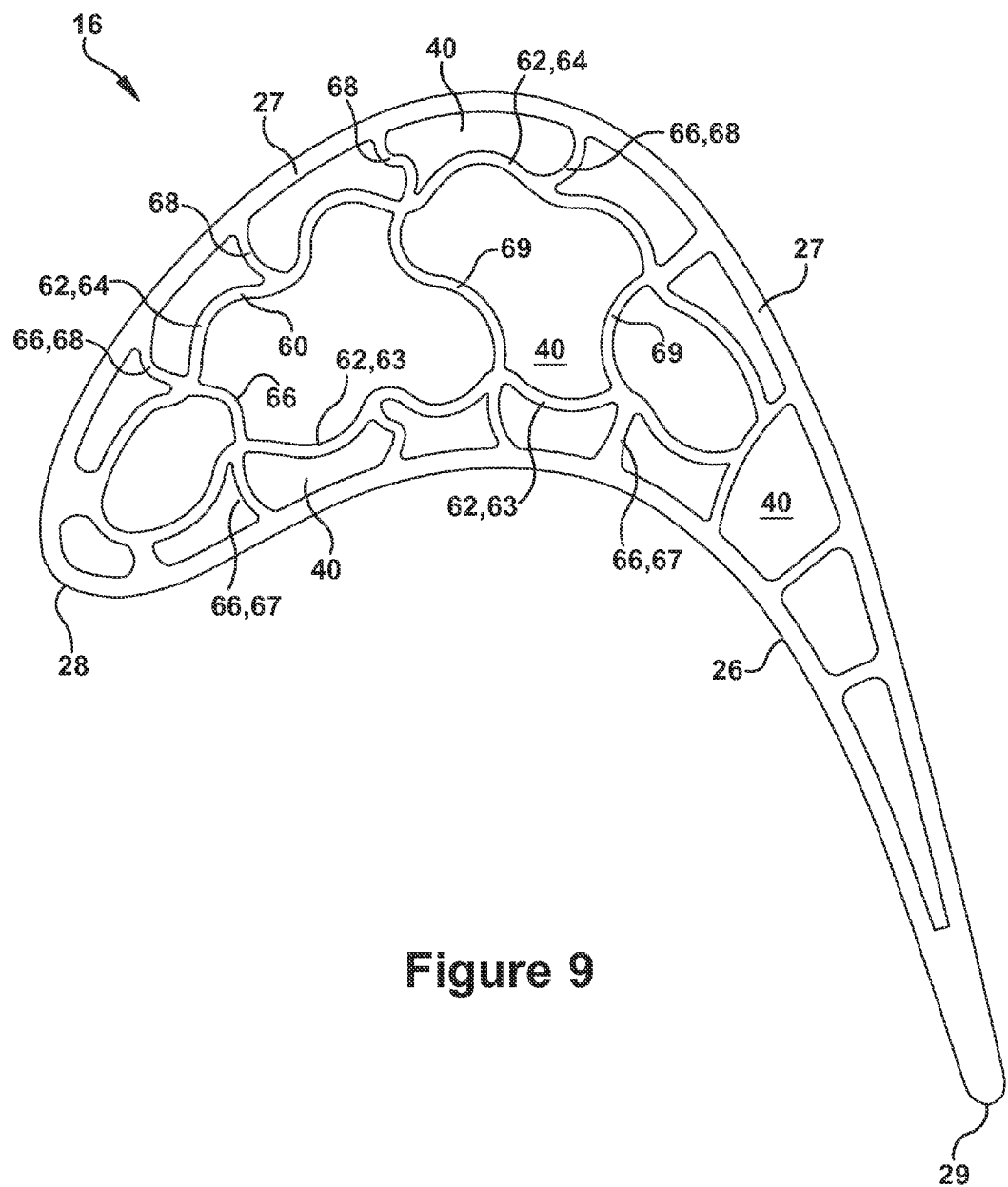
FIG. 9 is a cross-sectional view of a turbine rotor blade having an inner wall or rib configuration according to an alternative embodiment of the present invention.

As shown in FIG. 9, an alternative embodiment includes a camber line rib 62 that includes a repetition of concave segments. In this type of wavy rib embodiment, it will be appreciated that the wavy profile for the camber line ribs 62 (relative to the central flow passage 40) include successively stacked convex segments. In a preferred embodiment of this type, as illustrated, the camber line ribs 62 each includes at least four of these successively stacked concave segments. (It will be appreciated that in this type of embodiment, to avoid stress concentrations, a short convex segment may be used to connect the much longer convex segments.)

FIG. 9 also includes alternative embodiments of traverse ribs 66. As already mentioned, according to the present invention, center traverse ribs 69 may have a curved or arcing profile. Additionally, according to alternative embodiments, pressure side and suction side traverse ribs 67, 68 also may include curved profiles. Exemplary types of curved profiles are shown along the suction side of the airfoil 25 in FIG. 9. Specifically, as indicated, suction side and pressure side traverse rib 67, 68 may form an arc between the walls they connect. The arc maybe oriented such that a convex face points towards the leading edge 28 of the airfoil 25. Alternatively, the arc maybe oriented such that a concave face points towards the leading edge 28 of the airfoil 25. As also shown in FIG. 9, similar to camber line ribs 62, traverse ribs 66 may be configured having a "S" shape. As indicated, in a preferred embodiment, this configuration may be included on center traverse ribs 69. In alternative embodiments, a "S" shape may be used with either pressure side traverse ribs 67 or suction side traverse ribs 68 or both. Further, in a preferred embodiment, as shown toward the leading edge 28 of the airfoil 25 in FIG. 9, the pressure side traverse rib 67, the suction side traverse rib 68, and the center traverse rib 69 form a wavy profile or "S" shape by alternating how the arcs formed by each is oriented. That is, the pressure side traverse rib 67 presents a convex face toward the leading edge 28, then the center traverse rib 69 is a concave face toward the leading edge 28, and then the suction side traverse rib 68 presents a convex face toward the leading edge 28 of the airfoil 25.

According to the present invention, the internal structure of an airfoil may include wavy ribs along the camber line direction of the airfoil. By making the camber line rib 62 into a spring in this way, the internal backbone of the airfoil may be made more compliant so that performance advantages may be achieved. In addition, the traverse ribs of the airfoil structure may be curved so to further soften the load path, as well as making more compliant connections with the ribs 62 and outer walls 26, 27 that they connect. Whereas standard linear rib designs experience high stress and low cyclic life due to the thermal fight between the internal cooling cavity walls and the much hotter outer walls, the present invention provides a spring-like construction that is better able to disburse stress concentrations, which, as provided herein, may be used to improve the life of the component.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A turbine blade comprising an airfoil defined by a concave shaped pressure side outer wall and a convex shaped suction side outer wall that connect along leading and trailing edges and, therebetween, form a radially extending chamber for receiving the flow of a coolant, the turbine blade further comprising:
   a rib configuration that partitions the chamber into radially extending flow passages;
   wherein the rib configuration includes a camber line rib having a wavy profile;
   wherein a camber line rib having a wavy profile comprises one that originates toward the leading edge of the airfoil and winds back-and-forth across an arcing path that extends toward the trailing edge of the airfoil, the arcing path approximately parallel to a camber reference line of the airfoil;
   wherein the arcing path of the camber line rib comprising a length that is at least 15% of a length of the camber reference line of the airfoil;
   wherein the rib configuration includes two camber line ribs in which a pressure side camber line rib comprises one residing near the pressure side outer wall, and a suction side camber line rib comprises one residing near the suction side outer wall, wherein both of the pressure side camber line rib and the suction side camber line rib comprise the wavy profile;
   wherein the pressure side camber line rib and the suction side camber line rib define a center flow passage therebetween; and the pressure side outer wall and the pressure side camber line rib define a pressure side flow passage therebetween; and the suction side outer wall and the suction side camber line rib define a suction side flow passage therebetween;
   wherein the rib configuration comprises:
      four pressure side traverse ribs that connect the pressure side outer wall to the pressure side camber line rib and thereby partition the pressure side flow passage;
      four suction side traverse ribs that connect the suction side outer wall to the suction side camber line rib and thereby partition the suction side flow passage; and
      two center traverse rib that connects the pressure side camber line rib to the suction side camber line rib and thereby partitions the center flow passage;
   wherein two of the four pressure side traverse ribs are configured so to form an angle of connection with the pressure side outer wall of less than about 60 degrees;
   wherein two of the four suction side traverse ribs are configured so to form an angle of connection with the suction side outer wall of less than about 60 degrees; and
   wherein one of the two center traverse ribs form an angle of connection of less than about 60 degrees at each of the suction side camber line rib and the pressure side camber line rib.

2. The turbine blade according to claim 1, wherein the wavy profile comprises at least one back-and-forth "S" shape; and wherein the turbine blade comprises one of a turbine rotor blade and a turbine stator blade.

3. The turbine blade according to claim 2, wherein a camber line rib having a wavy profile comprises one that originates near the leading edge of the airfoil and winds back-and-forth across an arcing path that extends toward the trailing edge of the airfoil, the arcing path approximately parallel to a camber reference line of the airfoil; and wherein the arcing path of the camber line rib comprising a length that is at least 50% of a length of the camber reference line of the airfoil.

4. The turbine blade according to claim 1, wherein the wavy profile comprises at least two consecutive back-and-forth "S" shapes;
wherein the turbine blade comprises a turbine rotor blade.

5. The turbine blade according to claim 1, wherein the wavy profile for each of the pressure side camber line rib and the suction side camber line rib comprises one that, relative to the central flow passage, includes at least two successive segments in which a first concave segment transitions to a second convex segment.

6. The turbine blade according to claim 1, wherein the wavy profile for each of the pressure side camber line rib and the suction side camber line rib comprises one that, relative to the central flow passage, includes at least four successive segments in which a first concave segment transitions to a second convex segment and the second convex segment transitions to a third concave segment and the third concave segment transitions to a fourth convex segment.

7. The turbine blade according to claim 1, wherein the wavy profile for each of the pressure side camber line rib and the suction side camber line rib comprises one that, relative to the central flow passage, includes at least three successively stacked convex segments.

8. The turbine blade according to claim 1, wherein the wavy profile for each of the pressure side camber line rib and the suction side camber line rib comprises one that, relative to the central flow passage, includes at least three successively stacked concave segments.

9. The turbine blade according to claim 1, wherein the rib configuration comprises traverse ribs; and wherein each of the traverse ribs comprises one configured to extend across the airfoil so as to connect one of the camber line ribs to at least one of the pressure side outer wall, the suction side outer wall, and the other camber line rib.

10. The turbine blade according to claim 1, wherein the rib configuration is arranged so that the pressure side flow passage, the suction side flow passage, and center flow passage extend radially between a first end positioned near an inboard boundary of the airfoil and a second end positioned near an outboard boundary of the airfoil; and wherein at least one of the pressure side flow passage, the suction side flow passage, and center flow passage connects to a supply passage which is configured to receive a flow of coolant through a root of the rotor blade during operation.

11. The turbine blade according to claim 1, wherein three of the four pressure side traverse ribs are configured so to form an angle of connection with the pressure side outer wall of less than about 60 degrees;

wherein three of the four suction side traverse ribs are configured so to form an angle of connection with the suction side outer wall of less than about 60 degrees; and wherein the two center traverse ribs form an angle of connection of less than about 60 degrees at each of the suction side camber line rib and the pressure side camber line rib.

12. The turbine blade according to claim 1, wherein one of the center traverse ribs comprise an arc between the suction side camber line rib and the pressure side camber line rib.

13. The turbine blade according to claim 1, wherein both of the center traverse ribs comprise an arc between the suction side camber line rib and the pressure side camber line rib; and wherein the arc of each of the two center traverse ribs comprises a concave face directed toward the leading edge.

14. The turbine blade according to claim 1, wherein both of the center traverse ribs comprise an arc between the suction side camber line rib and the pressure side camber line rib; and wherein the arc of each of the two center traverse ribs comprises a convex face directed toward the leading edge.

15. The turbine blade according to claim 1, wherein one of the center traverse ribs comprise a profile having a "S" shape; and wherein the "S" shape, relative to the leading edge of the airfoil, includes two successive curved faces in which a first concave face transitions to a second convex face.

16. The turbine blade according to claim 1, wherein two of the pressure side traverse ribs comprise an arc between the pressure side camber line rib and the pressure side outer wall; and wherein two of the suction side traverse ribs comprise an arc between the suction side camber line rib and the suction side outer wall.

17. A turbine blade comprising an airfoil defined by a concave shaped pressure side outer wall and a convex shaped suction side outer wall that connect along leading and trailing edges and, therebetween, form a radially extending chamber for receiving the flow of a coolant, the turbine blade further comprising:

a rib configuration that partitions the chamber into radially extending flow passages;
wherein the rib configuration includes a camber line rib having a wavy profile;
wherein a camber line rib having a wavy profile comprises one that originates toward the leading edge of the airfoil and winds back-and-forth across an arcing path that extends toward the trailing edge of the airfoil, the arcing path approximately parallel to a camber reference line of the airfoil;
wherein the arcing path of the camber line rib comprising a length that is at least 15% of a length of the camber reference line of the airfoil;
wherein the rib configuration includes two camber line ribs in which a pressure side camber line rib comprises one residing near the pressure side outer wall, and a suction side camber line rib comprises one residing near the suction side outer wall, wherein both of the pressure side camber line rib and the suction side camber line rib comprise the wavy profile;
wherein the pressure side camber line rib and the suction side camber line rib define a center flow passage therebetween; and the pressure side outer wall and the pressure side camber line rib define a pressure side flow passage therebetween; and the suction side outer wall and the suction side camber line rib define a suction side flow passage therebetween;

wherein the rib configuration comprises:

four pressure side traverse ribs that connect the pressure side outer wall to the pressure side camber line rib and thereby partition the pressure side flow passage;

four suction side traverse ribs that connect the suction side outer wall to the suction side camber line rib and thereby partition the suction side flow passage; and two center traverse rib that connects the pressure side camber line rib to the suction side camber line rib and thereby partitions the center flow passage;

wherein two of the pressure side traverse ribs comprise an arc between the pressure side camber line rib and the pressure side outer wall; and wherein two of the suction side traverse ribs comprise an arc between the suction side camber line rib and the suction side outer wall.

\* \* \* \* \*